United States Patent [19]
Fleming, III

[11] Patent Number: 6,031,894
[45] Date of Patent: Feb. 29, 2000

[54] METHOD AND APPARATUS FOR LOCATING A STOLEN ELECTRONIC DEVICE USING AUTOMATIC NUMBER IDENTIFICATION

[75] Inventor: Hoyt A. Fleming, III, Boise, Id.

[73] Assignee: Micron Electronics, Inc., Nampa, Id.

[21] Appl. No.: 08/863,094

[22] Filed: May 23, 1997

[51] Int. Cl.[7] .......................... H04M 11/04; H04M 3/42
[52] U.S. Cl. .................... 379/44; 379/106.01; 379/142; 379/201; 379/216
[58] Field of Search ................................ 379/40, 51, 201, 379/106, 127, 202, 203, 142, 44, 106.01, 216; 709/200

[56] References Cited

U.S. PATENT DOCUMENTS

| | | | |
|---|---|---|---|
| 5,329,578 | 7/1994 | Brennan et al. | 379/88.19 |
| 5,341,414 | 8/1994 | Popke | 379/142 |
| 5,412,708 | 5/1995 | Katz | 348/14 |
| 5,422,930 | 6/1995 | McDonald et al. | 379/58 |
| 5,475,734 | 12/1995 | McDonald et al. | 379/58 |
| 5,479,482 | 12/1995 | Grimes | 455/556 |
| 5,544,235 | 8/1996 | Ardon | 379/177 |
| 5,548,637 | 8/1996 | Heller et al. | 379/201 |
| 5,729,596 | 3/1998 | Reeder et al. | 379/102.04 |
| 5,764,892 | 6/1998 | Cain et al. | 709/200 |

OTHER PUBLICATIONS

Internet Article: "Welcome to CompuTrace", http:/www-.computrace.com/about/index.html dated Mar. 12, 1997.

*Primary Examiner*—Scott Wolinsky
*Attorney, Agent, or Firm*—Trop, Pruner, Hu & Miles, P.C.

[57] ABSTRACT

A method for locating an electronic device such as a stolen portable computer. The method includes initiating a phone call; receiving automatic number identification (ANI) information; and terminating the phone call before the call is answered. The received ANI information may then be provided to law enforcement agencies so that they may retrieve the electronic device. The act of initiating and terminating may be performed by a computer or a modem.

22 Claims, 2 Drawing Sheets

METHOD AND APPARATUS FOR LOCATING A STOLEN ELECTRONIC DEVICE USING AUTOMATIC NUMBER IDENTIFICATION

BACKGROUND OF THE INVENTION

1. Field of the Invention

The present invention relates generally to an apparatus and method for locating stolen property, and more particularly to locating a stolen electronic device, such as a computer, using the automatic number identification capabilities of a communication network.

2. Description of Related Art

Personal computers have become increasingly compact and portable and now commonly accompany business travelers into a variety of unprotected, public places. As a result, these items have become a favorite target for thieves. Portable computers, such as notebook and laptop computers, are commonly stolen in public places such as airports.

Many computers, especially portable computers, are equipped with modems for remote communication. These modems allow the user access to services such as remote connections to office networks and the Internet. In addition, the modems allow the user to transmit and receive facsimiles.

At least one prior art computer tracking system for locating stolen computers exists. A user desiring to use this system first installs a software program on his computer. The software program instructs the computer to call a third party monitoring service at regular intervals. When the computer calls the monitoring service, the computer establishes a data link and transmits data to the monitoring service that identifies the computer. When the monitoring service receives a call from the user's computer, the monitoring service is able to determine the location of the computer by utilizing Caller ID. The location of the computer may then be forwarded to a law enforcement agency so that they may retrieve the computer. However, such a tracking system is not optimal because it requires a third party monitoring service. This monitoring service charges a fee for monitoring. In addition, the system is not optimal because the system incurs long distance charges that result from the periodic phone calls to the monitoring service. (Even if 1-800 numbers are used, the charges are still indirectly paid by a user subscribing to the monitoring service.) The presence of such long distance phone charges may also alert a thief to the monitoring, thus reducing the effectiveness of the tracking system.

Thus, there is a need for a stolen computer tracking system that does not require long distance phone calls be placed from the computer, thus minimizing the cost for the computer owner and reducing the likelihood that a thief will become aware of the monitoring.

SUMMARY OF THE INVENTION

Embodiments of a method for locating an electronic device such as a stolen portable computer are disclosed. One embodiment of the method includes initiating a phone call; receiving automatic number identification (ANI) information; and terminating the phone call before the call is answered. The received ANI information may then be provided to law enforcement agencies so that they may retrieve the electronic device. The acts of initiating and terminating may be performed by a computer or a modem.

BRIEF DESCRIPTION OF THE DRAWINGS

The foregoing and other advantages of the invention will become apparent upon reading the following detailed description and upon reference to the drawings in which.

DESCRIPTION OF THE INVENTION

Description of the First Embodiment

Figure 1:
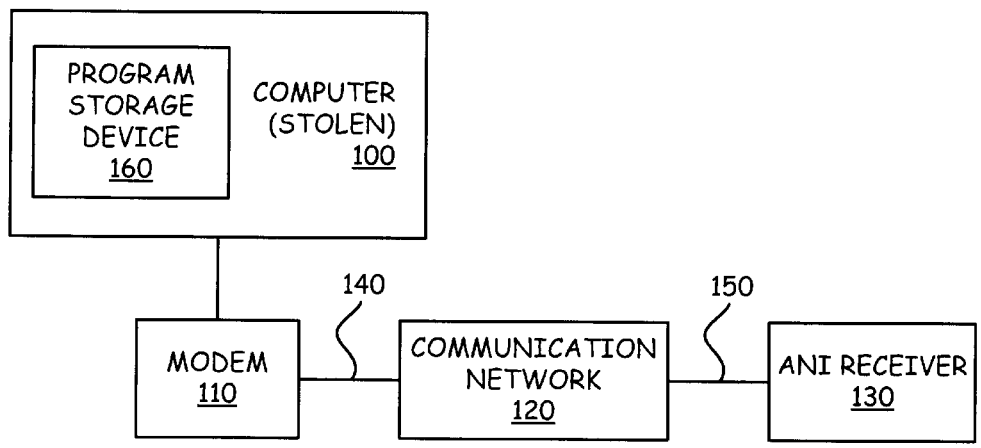
FIG. 1 is a block diagram of one embodiment of the invention.

FIG. 1 shows one embodiment of the invention that includes an electronic device such as a computer 100. In addition the embodiment includes a modem 110, a communication network 120, and an ANI receiver 130.

Electronic Device

The invention will be described in reference to personal computers, however, it is applicable to any electronic device capable of being connected to a communications network that supplies ANI information. Other electronic equipment, such as satellite receivers, telephones, and facsimile machines, are currently capable of being connected to telephone lines for remote communication and are also "electronic devices." As the integration of multimedia devices progresses, it is contemplated that devices such as televisions, and other media devices will also be capable of being tracked using ANI information.

As shown in FIG. 1, the computer 100 is conventionally coupled to a modem 110.

Modem

The modem 110 shown in FIG. 1 is a conventional modem. Modems are well known in the art. Many computers are equipped with modems for remote communication. These modems may be internal or external modems. As shown in FIG. 1, the modem 110 is coupled to the computer 100 and also to a communication network 120.

Communication Network

In one embodiment, the communication network 120 may be the publicly switched telephone network (PSTN). In other embodiments, the communication network 120 may be a cellular network, a cellular network coupled to a PSTN, a local area network, or a wide area network. All that is required of the communication network 120 that it is capable of transmitting automatic number identification (ANI).

ANI Information

As is well known, some communication networks provide ANI. For example the PSTN network provides ANI information through a service known as Caller ID. Caller ID transmits data indicating the origin of a phone call to the receiver of the call. While cellular phone networks do not currently provide ANI information, it is anticipated that they will soon provide ANI information similar to that of the PSTN due to current problems with emergency calls (e.g. 911) not being properly handled. Similar ANI information may be provided by local or wide area networks in the future as well.

Local phone companies utilize Caller ID format to transmit ANI information. However, ANI information may be transmitted in other formats as well. The invention is intended to be limited to ANI information that is formatted in the well known Caller ID format. The ANI information may be in any analog, digital or mixed format.

ANI information typically includes all or some of the following information fields:

Month: A two digit number (01–12) identifying the month.

Day: A two digit number (01–31) identifying the day of the month.

Hour: A two digit number (01–24) identifying the hour in military time.

Minutes: A two digit number (00–59) identifying the minutes.

Caller #: The phone number from which the call is placed (Typically 10 digits, including the area code).

Caller Name: The name associated with the phone number from which the call is placed (Typically determined by the name listed in the telephone book for that number, such as an individual or a business name).

However, this list is neither exclusive nor exhaustive, only exemplary.

When the ANI information is in Caller ID format, the ANI information is transmitted in between the first and second rings and is transmitted in approximately 718 ms. Any information that completely or partially identifies the originator of a communication or data transfer of a communication network is considered to be ANI information.

ANI Receiver

As shown in FIG. 1, an ANI receiver 130 is coupled to the communication network 120 via an owner phone line 150. The ANI receiver 130 may comprise a Caller ID box, which is widely and publicly available from many commercial vendors, or another device programmed to decode ANI information supplied by the communication network 120. For example, many modem telephones decode ANI information. In addition, many computer systems and modems also decode ANI information. The term "ANI receiver" is intended to include any device that decodes and optionally displays ANI information.

Method of Operation of the First Embodiment

Figure 2:
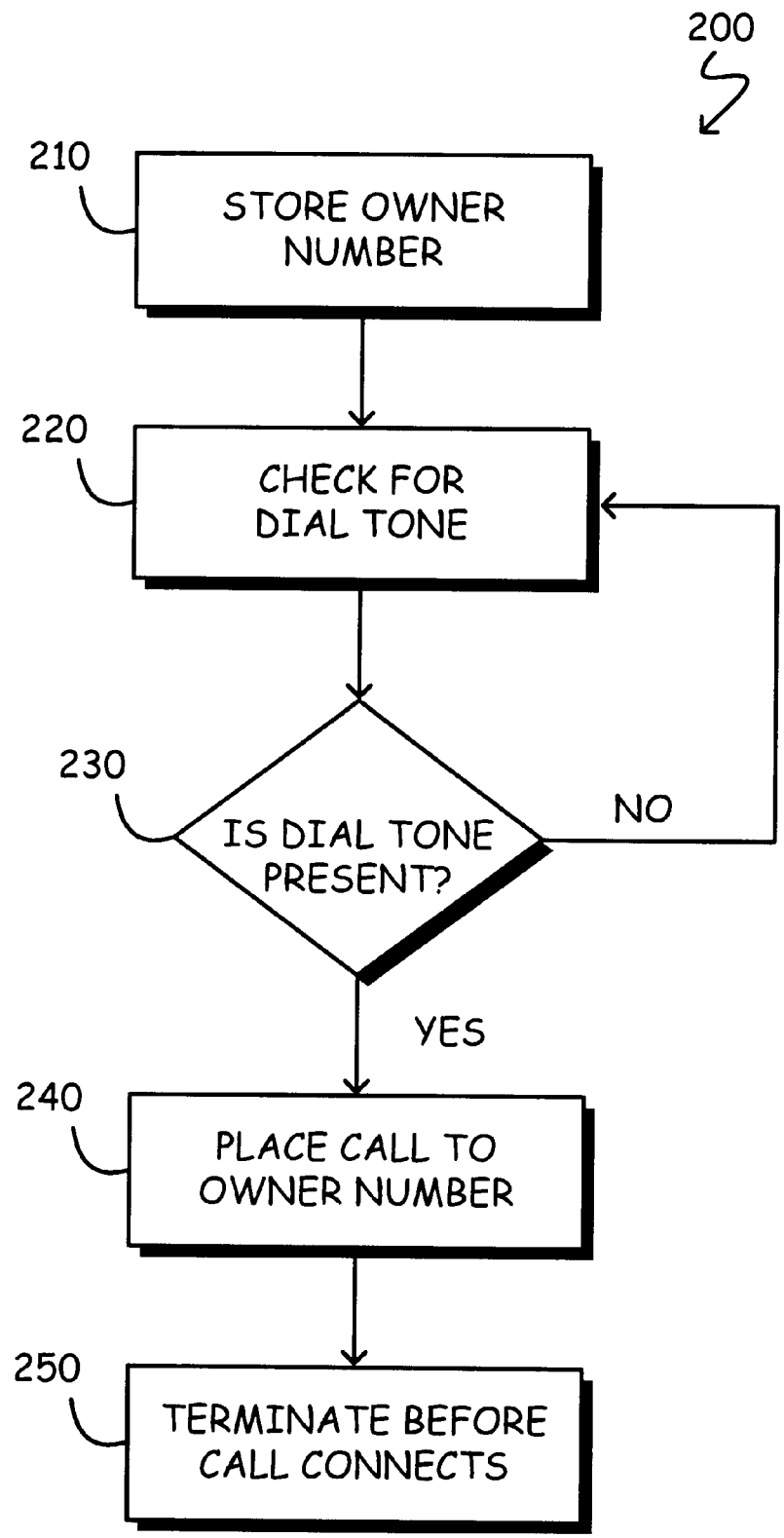
FIG. 2 illustrates a flow diagram of one embodiment of a location tracking method.

Referring to FIG. 2, a flow chart for one embodiment of a method of locating a stolen computer in accordance with the invention is shown. The method may be implemented by a location tracking program 200 that is conventionally executed on the computer 100. The location tracking program 200 is initially installed on the computer 100. During installation, as shown in block 210, the location tracking program 200 will store an owner phone number in the computer. In many cases, the owner phone number will be a phone number at the office or residence of the owner. However, any valid phone number may be utilized as long as the phone line associated with the number is coupled to an ANI receiver. The owner number may include a long distance number and/or a local number.

In block 220, the computer 100 periodically checks for a dial tone to determine if the computer 100 is connected to a phone line 140. The periodic checking may be conducted at random time intervals or on regularly timed intervals, the length of which may be programmable by the owner (e.g. 1/hour, 1/day, 1/week, etc.). Alternatively, the periodic checking may be in response to certain predetermined events, such as the formatting of a hard disk, the use of an incorrect password, modification of CMOS setup memory, etc., which may indicate a thief trying to circumvent security measures. The detection of such acts is known by those skilled in the art.

If a dial tone is detected in block 230, a call is initiated to the owner phone number as shown in block 240. The modem 110 may be silenced to minimize the likelihood that the thief will be alerted to the initiation of the call. Modems 110 are commonly configured to mute the modem speaker. When the call is initiated, the communication network 120 supplies ANI information to an ANI receiver at the owner phone number. The call is then terminated in block 250 before the call is answered by a person or by a device attached to the owner phone line 150. Because ANI information in Caller ID format is sent in between the first and second rings, the call may be terminated upon detection of the second ring. Alternatively, the call may be terminated approximately 750 ms after completion of the first ring. Generally, peripheral devices such as computers, fax machines, answering machines, etc. are configurable to answer an incoming call after a preset number of rings (e.g. 4 rings). Thus, the owner would configure any devices attached to the owner phone line 150 to answer at a number of rings greater than two. Because the call is terminated before the call is answered, no long distance phone charges would appear on the telephone bill of the thief. Thus, the thief would not be alerted to the presence of the tracking program. The ANI information received by the owner on the ANI receiver may then be supplied to law enforcement agency to locate the thief and the stolen computer.

Description of a Second Embodiment

It may be optimal for the owner phone number to be the phone number that is associated with the telephone line to which the computer 100 is normally connected. Thus, when the location tracking program instructs the computer 100 to initiate a call to the owner phone number, the location tracking program 200 would receive a busy signal and terminate the call. If the computer 100 were to be connected to any other phone line the ANI information would appear on the ANI receiver 130, and the owner would disregard that information.

Description of a Third Embodiment

A thief may attempt to circumvent security measures after stealing the computer 100. For instance, to erase any type of security program present on the computer 100, a thief may reformat the hard disk drive. Thus, one embodiment of the invention stores the tracking program 200 in a program storage device that is separate from the hard disk drive. For example, the tracking program 200 may be conventionally stored in a PROM, EPROM, or EEPROM. Such storing would typically be performed by a computer manufacturer. In addition, the owner phone number may be stored in a section of a hard disk drive, such as the boot sector, that is not overwritten during a hard disk drive reformat operation. Alternatively, the owner phone number may be stored in CMOS memory such as the CMOS memory that stores the computer's setup parameters. Thus, the program storage device 160 of FIG. 1 may be a hard disk, PROM, EPROM, EEPROM, CMOS memory, or any other such suitable storage device that is known in the art.

Description of the Fourth Embodiment

Figure 3:
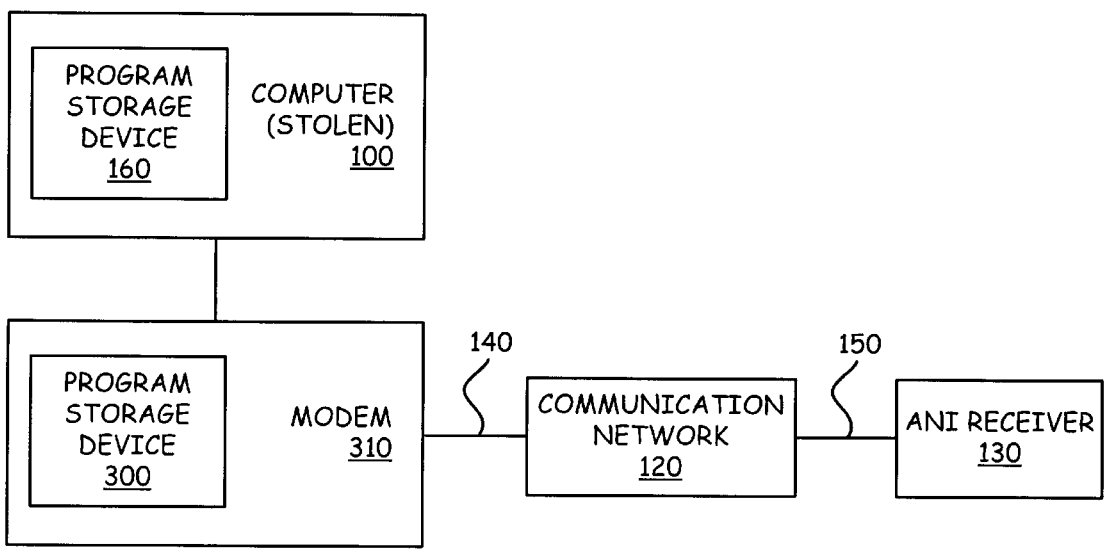
FIG. 3 is a block diagram of another embodiment of the invention.

In still another embodiment, as shown in FIG. 3, the tracking program 200 would be stored in a program storage device 300 within the modem 310. Many conventional modems contain PROM, EPROM, or EEPROM program storage devices that contain initialization code for the modem. In this embodiment, the owner phone number could be stored in either a program storage device 300 within the modem 300 or a program storage device 160 within the computer 100.

Description of the Fifth Embodiment

In still another embodiment, the owner phone number may be modified only if a predetermined password is provided. The initial password may be set by a user who installs the tracking program 200. Alternatively, the initial password may be set by the manufacturer of the computer if it installs the tracking program 200. Thus, if the computer 100 is "lost in shipping" from the computer manufacturer to the computer owner, the manufacturer may be able to locate the "lost" computer 100.

Remarks

The different embodiments of the present invention provide computer users with simple and efficient methods of locating and retrieving stolen electronic devices such as portable computers. The methods do not require the expense of third party monitoring services. In addition, the methods allow termination of a phone call before the call is answered. Thus, thieves will not be alerted to the presence of the tracking program by long distance phone charges on their phone bill.

Those skilled in the art will now see that certain modifications can be made to the methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

What is claimed is:

1. A method, performed by an electronic device at a first location, for enabling an owner to determine the location of the electronic device in response to a detected attempt to circumvent security measures incorporated into the electronic device, the method comprising:

initiating a phone call to a target location via a communication network providing automatic number identification (ANI) information without alerting a user of the electronic device;

maintaining the phone call for a predetermined period of time only sufficient to allow the communication network to transmit to the target location ANI information identifying the first location; and terminating the phone call in response to the expiration of the predetermined period of time.

2. The method of claim 1 wherein the act of initiating includes dialing a phone number of the owner.

3. The method of claim 2 further comprising updating the owner phone number only if a predetermined password is provided.

4. The method of claim 2 further comprising updating the owner phone number only if a predetermined password is provided, wherein the owner phone number is stored on a computer program storage device by a computer manufacturer.

5. The method of claim 1 wherein the acts of initiating, maintaining, and terminating are repeated at random time intervals.

6. The method of claim 1 wherein the acts of initiating, maintaining, and terminating are repeated at constant time intervals.

7. The method of claim 1 wherein the act of initiating occurs upon detection of an act selected from the following acts:

(a) formatting a hard disk drive of the electronic device,
   (b) modifying CMOS memory of the electronic device, and
   (c) receiving an incorrect password associated with the electronic device.

8. The method of claim 1 wherein the act of initiating without alerting the user comprises muting a speaker on the electronic device.

9. The method of claim 1 wherein the act of initiating includes dialing at least one of a long distance phone number and a local phone number.

10. The method of claim 1 wherein the act of initiating and the act of terminating are performed by a modem.

11. A program storage device storing instructions that when executed by an electronic device at a first location, enables an owner to determine the location of the electronic device in response to a detected attempt to circumvent security measures incorporated into the electronic device by performing a method comprising:

initiating a phone call to a target location via a communication network providing automatic number identification (ANI) information without alerting a user of the electronic device;

maintaining the phone call for a predetermined period of time only sufficient to allow the communication network to transmit to the target location ANI information identifying the first location; and terminating the phone call in response to the expiration of the predetermined period of time.

12. The program storage device of claim 11 wherein the acts of initiating, maintaining, and terminating are repeated at random time intervals.

13. The program storage device of claim 11 wherein the acts of initiating, maintaining, and terminating are repeated at constant time intervals.

14. The program storage device of claim 11 wherein the act on initiating occurs upon detection of an act selected from the following acts:

(a) formatting a hard disk drive of the electronic device;
    (b) modifying CMOS memory of the electronic device; and
    (c) receiving an incorrect password associated with the electronic device.

15. A computer containing the program storage device of claim 11.

16. A modem containing the program storage device of claim 11.

17. The program storage device of claim 11, wherein the act of initiating includes dialing a phone number of the owner.

18. The program storage device of claim 17, wherein the method further comprises updating the owner phone number only if a predetermined password is provided.

19. The program storage device of claim 17, wherein the method further comprises updating the owner phone number only if a predetermined password is provided, and the owner phone number is stored on a computer program storage device by a computer manufacturer.

20. The program storage device of claim 11, wherein the act of initiating without alerting the user comprises muting a speaker on the electronic device.

21. The program storage device of claim 11, wherein the act of initiating includes dialing at least one of a long distance phone number and a local phone number.

22. The program storage device of claim 11, wherein the act of initiating and the act of terminating are performed by a modem.

* * * * *